April 5, 1966 C. H. BECKER 3,244,803
WIRING CLIP HAVING A ROTARY OPERABLE LOCKING DEVICE
Filed Aug. 26, 1964
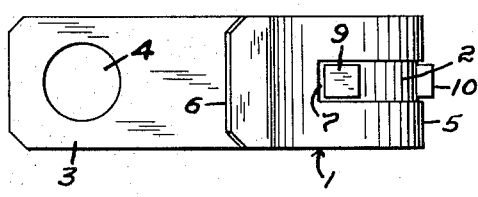
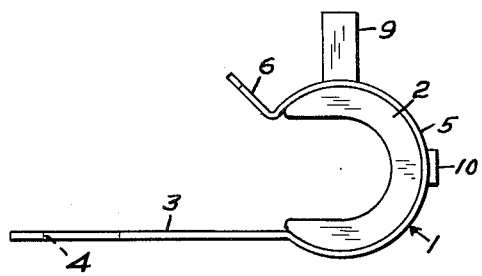
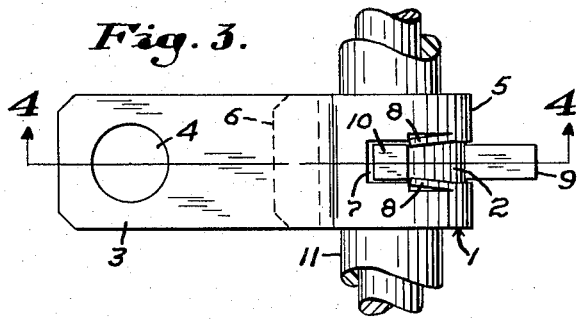
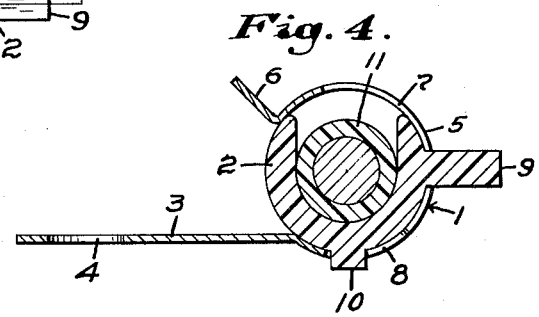
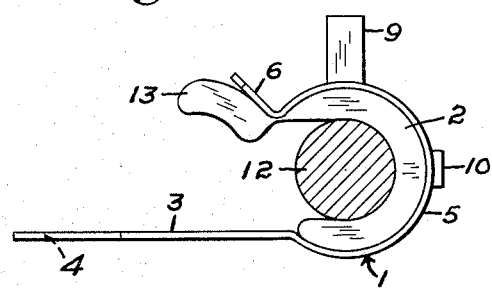
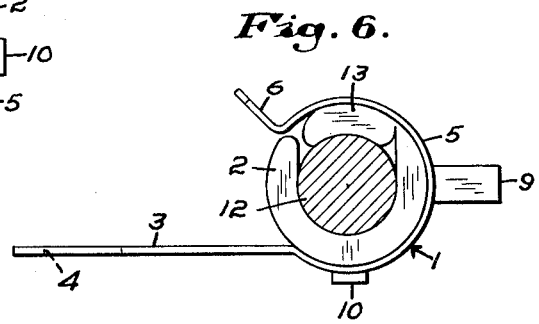
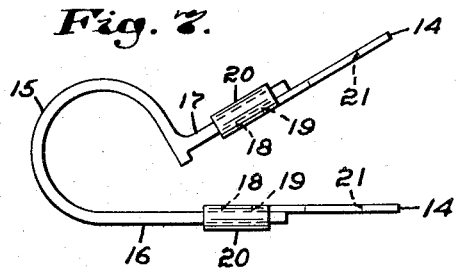
Inventor:
Charles H. Becker,
by Philip E. Parker
Atty.

United States Patent Office 3,244,803
Patented Apr. 5, 1966

3,244,803
WIRING CLIP HAVING A ROTARY OPERABLE LOCKING DEVICE
Charles H. Becker, Braintree, Mass., assignor to United-Carr Incorporated, Boston, Mass., a corporation of Delaware
Filed Aug. 26, 1964, Ser. No. 392,257
3 Claims. (Cl. 174—154)

The present invention relates generally to wiring and tubing clips and more specifically to a clip adapted to support a length of cable or tubing in lateral offset relationship with respect to an object to which the clip is attached.

The particular clip disclosed herein was initially designed to support the wiring harness extending from the alternator of an automobile engine, and while it is quite obvious that the clip might be used in numerous other applications, its use in conjunction with the alternator harness serves as an excellent basis for discussion of its advantages and contributions to the art.

Heretofore it has been the general practice of manufacturers to employ all metal clips in the alternator application primarily because the metal clips provide a rigid, firm support for the harness and are generally not adversely affected by heat radiated from the engine.

However, metal clips suffer the disadvantage of providing no insulation for a noninsulated conductor, for example, a ground strap. In addition, since the clips are usually formed from a simple metal stamping, they often have sharp, burred edges which can rupture and pierce the insulation of a wire or cable over periods of extended use. The result in many instances is a shorting of the connection.

It was originally thought that the use of plastic clips would overcome the deficiencies of metal clips mentioned above. However tests and usage have shown that the more rigid plastics tend to fracture when subjected to shock or continuous vibration, while the softer, more resilient plastics are often adversely affected by the heat radiated from the engine. For example a softening of the plastic arm will cause it to bend downwardly under the weight of the harness resulting in the loss of a firm, rigid connection.

Further in both the conventional metal and plastic clips both arms extending from the loop portion of the clip are bolted or riveted to the alternator or other object to secure the cable, thus rendering it somewhat difficult to remove for maintenance purposes etc.

The present invention in providing a combination metal and plastic clip overcomes each of the problems recited above. In addition by providing a rotatable insulator for capturing a cable within the clip the same cable is readily removed for replacement or maintenance purposes.

As a device for supporting a length of copper tubing the novel clip embodies excellent anti-rattle features.

Further it offers increased protection against chafing and wearing heretofore experienced with all metal tubing clamps particularly when used to support plastic or other flexible tubing.

Thus an object of the invention is to provide a useful, inexpensive clip which will rigidly support a conductor or length of tubing in lateral offset relation to an object to which the clip is attached.

Another object is to provide a combination insulator and wiring clip for supporting a noninsulated wire or cable.

Another object is to provide a wiring clip which offers increased protection to the insulation of an insulated conductor and the outer surface of a length of tubing.

A still further object is to provide a clip which will securely fasten a conductor or length of tubing to a support and at the same time allow for ready removal of said conductor or tubing for purposes of replacement or maintenance.

Other objects and advantages of the novel device will hereinafter become evident from a reading of the following detailed description in conjunction with a viewing of the accompanying drawings in which:

FIG. 1 is a top plan view of the wiring clip;
FIG. 2 is a side elevation of the clip;
FIG. 3 is a bottom plan view of the clip engaging an insulated conductor;
FIG. 4 is a section on line 4—4 of FIG. 3;
FIG. 5 is a side elevation of the clip engaging a noninsulated cable;
FIG. 6 is a view similar to FIG. 5 with the plastic insert-insulator rotated to the locking position;
FIG. 7 is a side elevation of a modification of the clip.

As a convenient means of disclosure, the invention is depicted as a wiring clip for supporting insulated and noninsulated electrical conductors. However those knowledgeable in the art will understand that the clip is operable to engage and support a length of copper, aluminum, plastic or other tubing in precisely the same manner as hereinafter described in conjunction with the electrical conductors.

The clip shown in FIGS. 1–6 is comprised of two main parts, namely, a metal housing 1 and a molded plastic insert-insulator 2.

The metal part includes a generally flat, straight attaching arm 3 which in an installation would overlie a surface of a support (not shown), for example, an automobile alternator, to which the clip is attached.

The arm 3 has an aperture 4 formed therein for receipt of a screw, bolt, rivet (not shown) or other attaching means. One end of the arm 3 continues in a loop portion 5 which is bent back on itself to described an arc greater than 180 degrees and terminates in a reverse bend portion 6.

As best shown in FIGS. 1 and 3 the loop 5 is bisected over the major portion of its arc by a slot 7. A portion of the metal adjacent the lower end of the slot 7 has been partially severed from the loop portion 5 at opposite sides of the slot to provide a pair of spring fingers 8, the purpose of which will be more fully explained hereinafter.

The insert-insulator 2 which is shown to be of synthetic, plastic material, for example, nylon, but which might also be made of any generally solid, nonelectrically conductive material, is seated within the loop portion 5. The insert 2 has generally the same arcuate configuration as the loop 5 and is movably retained therein by a pair of tabs 9 and 10, as shown in FIGS. 1 and 2, extend through the slot 7. Thus, the insert 2 may be rotated within the loop portion 5 from the position shown in FIG. 2 to the position shown in FIG. 4. With the insert 2 positioned as in FIG. 2 a conductor may be inserted laterally through the registered openings in the metal housing and the insert at any point along the length of a conductor. The insert is then rotated clockwise to the position shown in FIG. 4 such that a barrier is provided at the opening in the metal housing 1 and the conductor 11 is captured therein.

As best shown in FIG. 3, the insert-insulator 2 is retained in the closed position by the co-operative locking action of the tab 10 and the spring fingers 8. The tab 9 serves a two-fold purpose in that it co-operates with the walls of the slots 7 to properly maintain the insert 2 within the loop portion 5 and also provides a convenient means for grasping and rotating the insulator.

The reader will readily observe from a viewing of FIGS. 3 and 4 that the insulated conductor 11 is securely held within the clip and is insulated from the metal housing 1 to protect against cutting or piercing of the insulation of the conductor by sharp edges of said housing.

The invention as shown in FIGS. 5 and 6 is designed primarily for use with a noninsulated conductor 12. As shown in the referenced figures the insert 2 has an integral extension 13 which extends outwardly generally in the direction of the reverse bend portion 6 of the metal housing 1. Thus when the insert 2 is rotated clockwise to the position of FIG. 6 the extension 13 is drawn into the housing 1 and provides continuous insulation around the periphery of the conductor 12.

The function of the tabs 9 and 10 and the spring fingers 8 is the same as previously described.

The reader will appreciate that the invention allows for ready removal of either conductor for replacement or maintenance purposes. All the user need to do is separate the spring fingers 8 silghtly and roatate the insert 2 in a counterclockwise direction until the openings in the housing 1 and the insert 2 are again in alignment and then slide the conductor 11 or 12 to the left as shown in the drawings. In short there is no necessity for removing screws or bolts or upsetting rivets to remove the conductor as is the case with many heretofore used metal and plastic wiring clips.

A modified form of the invention is shown in side elevation in FIG. 7. This form is in many respects similar to the different varieties of all metal or all plastic clips previously discussed. However, it is believed that the precise combination of metal and plastic members shown in FIG. 7 is new in the art.

The clip includes a pair of metal attaching arms 14 and a molded plastic loop portion 15 adapted to slidably receive a conductor. The loop portion continues at one end in a generally flat base portion 16 and at the other end in a reverse bend extension 17 extending upwardly at approximately 90 degrees to the loop portion 15. Both the base 16 and the extension 17 have a small circular embossment 18 molded adjacent their termination which, in each instance, is seated in a small circular aperture 19 in each of the metal attaching arms 14.

Each of the arms 14 has a raised portion forming a generally rectangular sleeve 20 for receipt of the flat base 16 and the angular extension 17. The aforementioned parts are assembled by sliding the base 16 and extension 17 into each of the sleeves 20 until the bosses 18 seat in the small circular apertures 19 and thereafter crimping the sleeves 20 over the base and extension to provide a firm attachment therebetween.

In an installation a conductor (not shown) is slidably inserted in the loop 15 and the upper arm 14 is rotated downwardly until the fastener receiving apertures 21 in each of the arms 14 are in alignment. A bolt, screw, rivet or other appropriate fastener may then be passed through the aligned apertures 21 to secure the cilp to a support.

The reader will note that the modified form of the invention shown in FIG. 7 provides the same insulation and protection for a conductor in addition to a firm, rigid attachment to support characterized by the previously described forms of the invention. However, as is obvious, a conductor is not as readily removed from the modified clip in that the attaching fastener (not shown) must be removed to permit roatation of the upper arm 14 to the position shown in FIG. 7.

With reference to the foregoing description it is understood that what has been disclosed therein represents solely preferred forms of the invention and is to be construed as illustrative rather than restrictive or limiting in nature; the scope of the invention being best described by the following claims.

What is claimed:

1. A clip comprising an outer housing having a loop portion defining an article receiving opening, said loop portion having an elongated slot formed therein and a plurality of spring fingers partially sheared therefrom and extending angularly into said slot adjacent one end of said slot, and a keeper carried by said housing and having an article receiving opening registerable with the opening in said loop portion, said keeper being rotatable with respect to said housing to capture an article within said housing, said keeper having a handle for rotating same extending through the elongated slot in said housing and a locking tab also extending through said slot adapted to co-operate with said spring fingers to lock said keeper in one relative position with respect to said loop portion.

2. A clip according to claim 1 wherein said keeper is provided with an integral extension disposed outwardly of said loop portion when the openings in said loop portion and said keeper are in registration, said extension being adapted to be drawn into said loop portion when the keeper is rotated to the locked position.

3. A clip for securing a conductor to a support comprising an outer, sheet metal housing including an arm adapted to be fastened to the support and a loop portion defining an opening for receiving a conductor anywhere along its length, said loop portion having an elongated slot formed therein over a major portion of its length and a pair of integral flexible spring fingers sheared therefrom and extending angularly into said slot adjacent to one end of the slot, and an insulative keeper carried by said outer metal housing having a conductor receiving opening registerable with the opening in said loop portion, said keeper being rotatable with respect to said outer housing to capture a conductor within said clip, said keeper having a handle for rotating same extending through the elongated slot in the loop portion and an integral locking tab also extending through said slot whereby said tab will be engaged by said spring fingers to prevent accidental re-registration of the openings in said keeper and said loop portion when the former is rotated to one relative position with respect to the latter.

References Cited by the Examiner
UNITED STATES PATENTS

| | | | |
|---|---|---|---|
| 405,442 | 6/1889 | Stahl et al. | 24—224 |
| 503,778 | 8/1893 | Trimble | 174—155 X |
| 907,834 | 12/1908 | Marshall | 174—154 |
| 927,827 | 7/1909 | Burgess | 24—157 |
| 2,126,571 | 8/1938 | Morehouse | 24—157 |
| 3,133,147 | 5/1964 | Auld et al. | 174—154 |

FOREIGN PATENTS 70,602 12/1915 Austria.

LARAMIE E. ASKIN, *Primary Examiner.*